(12) United States Patent
Sato et al.

(10) Patent No.: US 10,535,984 B2
(45) Date of Patent: Jan. 14, 2020

(54) POWER DEVICE INCLUDING A SHORT-CIRCUIT SWITCH AND A SEPARATION SWITCH

(71) Applicant: Mitsubishi Electric Corporation, Chiyoda-ku (JP)

(72) Inventors: Motohiro Sato, Chiyoda-ku (JP); Katsuhiko Horinouchi, Chiyoda-ku (JP); Hirokazu Otani, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/778,644

(22) PCT Filed: Nov. 29, 2016

(86) PCT No.: PCT/JP2016/085305
§ 371 (c)(1),
(2) Date: May 24, 2018

(87) PCT Pub. No.: WO2017/122442
PCT Pub. Date: Jul. 20, 2017

(65) Prior Publication Data
US 2018/0358790 A1    Dec. 13, 2018

(30) Foreign Application Priority Data
Jan. 14, 2016    (JP) .................. 2016-005322

(51) Int. Cl.
*H02B 1/56*    (2006.01)
*H02B 13/035*    (2006.01)
(Continued)

(52) U.S. Cl.
CPC ........... *H02B 1/56* (2013.01); *H02B 13/0356* (2013.01); *H02B 13/045* (2013.01)

(58) Field of Classification Search
CPC . H02G 5/10; H02G 5/063; H02B 1/56; H02B 3/00; H02B 13/0356; H02B 13/045; H01H 33/56
(Continued)

(56) References Cited

U.S. PATENT DOCUMENTS 6,373,015 B1 *    4/2002    Marchand .......... H02B 13/0354
                                                                  218/139
7,414,375 B2 *    8/2008    Lee .................... H05K 7/20209
                                                                  318/268
(Continued)

FOREIGN PATENT DOCUMENTS

CN    1059989 A       4/1992
EP    1906503 A1 *   4/2008   ............... H02G 5/10
(Continued)

OTHER PUBLICATIONS

International Search Report dated Feb. 21, 2017 in PCT/JP2016/085305, filed on Nov. 29, 2016.
Office Action dated Aug. 1, 2019 in counterpart Chinese Application No. 201680078119.8, along with an English machine translation.

*Primary Examiner* — Zachary Pape
(74) *Attorney, Agent, or Firm* — Oblon, McClelland, Maier & Neustadt, L.L.P.

(57) ABSTRACT

A power device, which includes: an energizing conductor; a power generation unit configured to generate power that is induced by a magnetic flux of a current flowing through the energizing conductor; a power device unit configured to use the power generated in the power generation unit as a power source; a short-circuit switch capable of short-circuiting an output from the power generation unit; and a sealed container in which the energizing conductor, the power generation unit and the power device unit are included, and an insulating fluid is enclosed in the sealed container. This power device is provided as a highly reliable power device, which is used in an AC power system and does not induce (Continued)

an excessive voltage in the power generation unit when the power device unit is stopped in the state where the energized state of the energizing conductor is maintained.

10 Claims, 6 Drawing Sheets

(51) Int. Cl.
    *H02B 13/045*      (2006.01)
    *H02G 5/10*      (2006.01)
    *H01H 33/56*      (2006.01)

(58) Field of Classification Search
    USPC .................................. 361/600–678, 2, 3, 13
    See application file for complete search history.

(56) References Cited

U.S. PATENT DOCUMENTS

| | | | |
|---|---|---|---|
| 8,614,865 B2 * | 12/2013 | Andresen | H01L 31/02021 |
| | | | 361/3 |
| 2008/0088263 A1 | 4/2008 | Lee | |
| 2016/0226256 A1 * | 8/2016 | Falk | H01L 31/02021 |

FOREIGN PATENT DOCUMENTS

| | | |
|---|---|---|
| GB | 1193126 A | 5/1970 |
| JP | 5-28896 Y2 | 7/1993 |
| JP | 11-041732 A | 2/1999 |
| JP | 2001-245410 A | 9/2001 |

* cited by examiner

POWER DEVICE INCLUDING A SHORT-CIRCUIT SWITCH AND A SEPARATION SWITCH

TECHNICAL FIELD

The present invention relates to a power device used in a high-voltage alternating-current (AC) power system.

BACKGROUND ART

There is a gas insulated switchgear, for example, as a power device used in a high-voltage AC power system.

In such a power device, a high current flows through an energizing portion, so that heat generation becomes a problem. As a conventional gas insulated switchgear for cooling such an energizing portion, there is a disclosed configuration including: a coil configured to induce electromotive force by a magnetic flux generated in an energizing conductor; and a drive device configured to drive a fan using the electromotive force induced in the coil as a power supply (for example, see PTD 1).

CITATION LIST

Patent Document

PTD 1: Japanese Patent Laying-Open No. 2001-245410 (page 3, FIG. 3)

SUMMARY OF INVENTION

Technical Problem

A power device used in an AC power system is used continuously without being stopped for a long time period of several decades. During such the long time period, the fan and the drive device for driving this fan described above need to be stopped for maintenance such as inspections or replacement. When the fan and the drive device are stopped, an output terminal of the coil serving as their power source is to be opened. In the power device used in the AC power system, meanwhile, it is desirable to maintain the energized state also during the maintenance as described above. However, when the output terminal of the coil is opened in the state where the energized state is maintained, the resistance at the output terminal of the coil becomes infinite, to thereby induce an excessive voltage in the coil, which leads to a problem that the coil may be broken.

The present invention aims to provide a power device used in an AC power system and exhibiting high reliability without inducing an excessive voltage in a power generation unit when devices using the power generation unit as their power source are stopped in the state where the energized state of an energizing conductor is maintained.

Solution to Problem

A power device according to the present invention includes: an energizing conductor; a power generation unit configured to generate power that is induced by a magnetic flux of a current flowing through the energizing conductor; a power device unit configured to use power generated in the power generation unit as a power source; a short-circuit switch capable of short-circuiting an output from the power generation unit; and a sealed container in which the energizing conductor, the power generation unit and the power device unit are included, an insulating fluid being enclosed in the sealed container.

Advantageous Effects of Invention

According to the present invention, due to a short-circuit switch provided to allow short-circuit of an output from the power generation unit configured to generate power that is induced by a magnetic flux of the current flowing through the energizing conductor, a highly reliable power device can be achieved in such a manner that induction of an excessive voltage in the power generation unit is prevented by short-circuiting the short-circuit switch when an electrically powered device using the power generation unit as its power source is stopped.

DESCRIPTION OF EMBODIMENTS

First Embodiment

Figure 1:
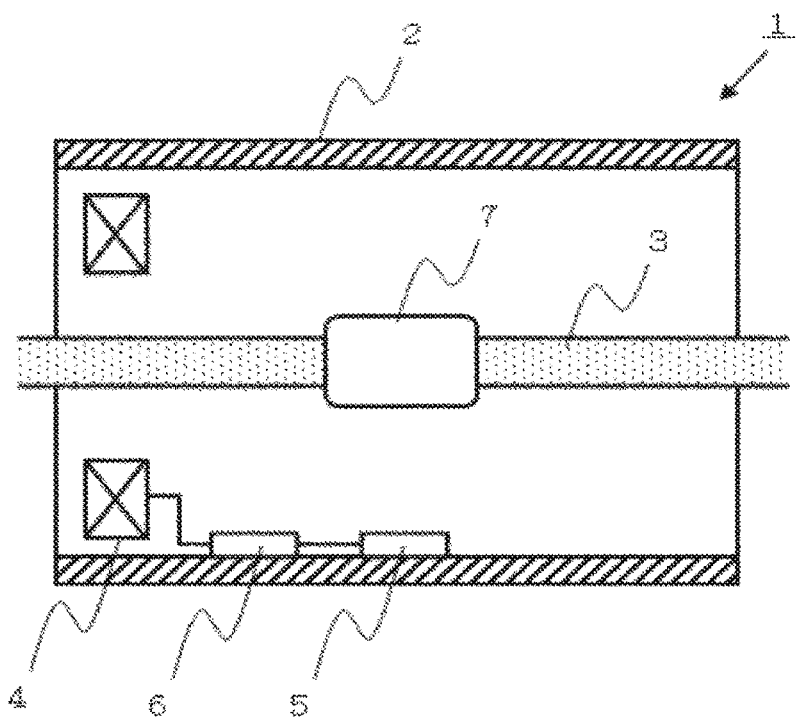
FIG. 1 is a schematic cross-sectional view of a power device in the first embodiment of the present invention.

FIG. 1 is a schematic cross-sectional view of a power device according to the first embodiment for implementing the present invention.

This power device is a gas insulated apparatus, for example, used as a bus of the power transmission line for AC power in an AC power system.

In a power device 1 in the present embodiment, an energizing conductor 3 formed in a rod shape is placed in the center portion of a cylindrical-shaped sealed container 2. Energizing conductor 3 is held by a spacer (not shown) at the position of the central axis of the sealed container. Also, a ring-shaped coil 4 is placed centrally around energizing conductor 3. Energizing conductor 3 penetrates through the center of this ring-shaped coil 4. Thus, ring-shaped coil 4 functions as a power generation unit configured to generate power that is induced by a magnetic flux of the current flowing through energizing conductor 3. Coil 4 has an output terminal to which a power device unit 5 configured to use power generated in coil 4 as its power source is connected. Furthermore, to this output terminal of coil 4, a short-circuit switch 6 capable of short-circuiting the output from coil 4 is connected.

Sealed container 2 is configured as one sealed container formed by connecting a plurality of cylindrical-shaped metal members by a flange and the like. Furthermore, energizing conductor 3 is formed by connecting rod-shaped metal members to each other by an energizing conductor connection portion 7. In the case of the gas insulated apparatus, sealed container 2 is filled inside with an insulating fluid, for example, $SF_6$ gas. Also, the electric potential of sealed container 2 is set at a ground potential, and the electric potential of energizing conductor 3 is set at an extra-high voltage of several kilovolts (kV) or higher due to a function as a bus through which an AC current flows.

Figure 2:
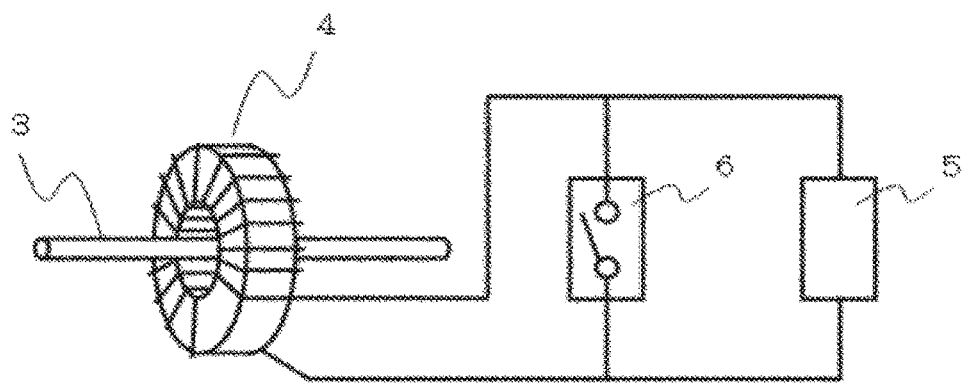
FIG. 2 is a schematic diagram showing a part of the power device in the first embodiment of the present invention.

FIG. 2 is a schematic diagram showing the connection relation of coil 4, power device unit 5 and short-circuit switch 6 in the present embodiment. Coil 4 serving as a power generation unit is formed of a ring-shaped iron core surrounding energizing conductor 3 and a copper wire wound around this iron core. In coil 4, electromotive force is induced by the AC current flowing through energizing conductor 3. The power generated in coil 4 is consumed by power device unit 5 connected to the output terminal of this coil 4. In the present embodiment, an electrically powered fan is used as power device unit 5. This electrically powered fan is disposed below energizing conductor connection portion 7 as shown in FIG. 1.

In the gas insulated apparatus used as a bus of the power transmission line for AC power, a high current of several kilo-amperes (kA) or higher steadily flows through energizing conductor 3. Energizing conductor 3 is designed to have a cross-sectional area such that, even if a high current flows therethrough, the quantity of heat produced thereby causes no problem. However, since a contact surface between metals exists in energizing conductor connection portion 7, the quantity of heat to be generated is increased by a high resistance value at this contact surface. Accordingly, the temperature of energizing conductor connection portion 7 rises. Sealed container 2 is filled with an insulating fluid such as $SF_6$ gas. Thus, convection is generated in this fluid by temperature rise in energizing conductor connection portion 7. The temperature rise in energizing conductor connection portion 7 is suppressed due to some degree of thermal diffusion. However, when the fluid with increased temperature stagnates in the upper portion inside sealed container 2, the convection stops, so that the effect of thermal diffusion is decreased.

In the power device in the present embodiment, since an electrically powered fan is disposed below energizing conductor connection portion 7 serving as a heat generating portion, the insulating fluid can be forcefully convected, so that the heat generating portion can be efficiently cooled. Furthermore, coil 4 configured to generate power that is induced by a magnetic flux of the current flowing through energizing conductor 3 is used as a power source of the electrically powered fan. Accordingly, accessory equipment such as an external power supply is not required.

In the gas insulated apparatus used as a bus of the power transmission line for AC power, it is desirable that the power on the bus is not stopped as much as possible even during maintenance such as safety checks and component replacement. This is due to a problem that, when general AC power is stopped, other devices connected to the power transmission system may be overloaded, which may lead to a power failure in the worst case. When power device unit 5 is disconnected from the output terminal of coil 4 under such conditions for safety checks and component replacement for power device unit 5, the resistance at the output terminal of coil 4 becomes infinite. When the resistance at the output terminal of coil 4 becomes infinite, there is a possibility that an excessive voltage may be induced in coil 4, so that coil 4 may be broken.

In the present embodiment, short-circuit switch 6 capable of short-circuiting the output from coil 4 is provided. Thus, if short-circuit switch 6 is short-circuited when the electrically powered device using coil 4 corresponding to a power generation unit as a power source is stopped, an excessive voltage is not induced in coil 4. Consequently, a highly reliable power device can be achieved.

In the present embodiment, an explanation has been made with regard to the example in which an electrically powered fan is used as power device unit 5, but a temperature sensor and the like can be used in place of the electrically powered fan. In this case, the temperature in energizing conductor connection portion 7 as a heat generating portion is monitored by the temperature sensor. Then, when the temperature becomes a certain degree of temperature or higher, it becomes also possible to perform control, for example, so as to decrease the current flowing through the energizing conductor. Also, in the present embodiment, the electrically powered fan is disposed below the energizing conductor connection portion. However, the electrically powered fan may be disposed in any other positions at which the insulating fluid inside the sealed container can be forcefully convected.

Second Embodiment

Figure 3:
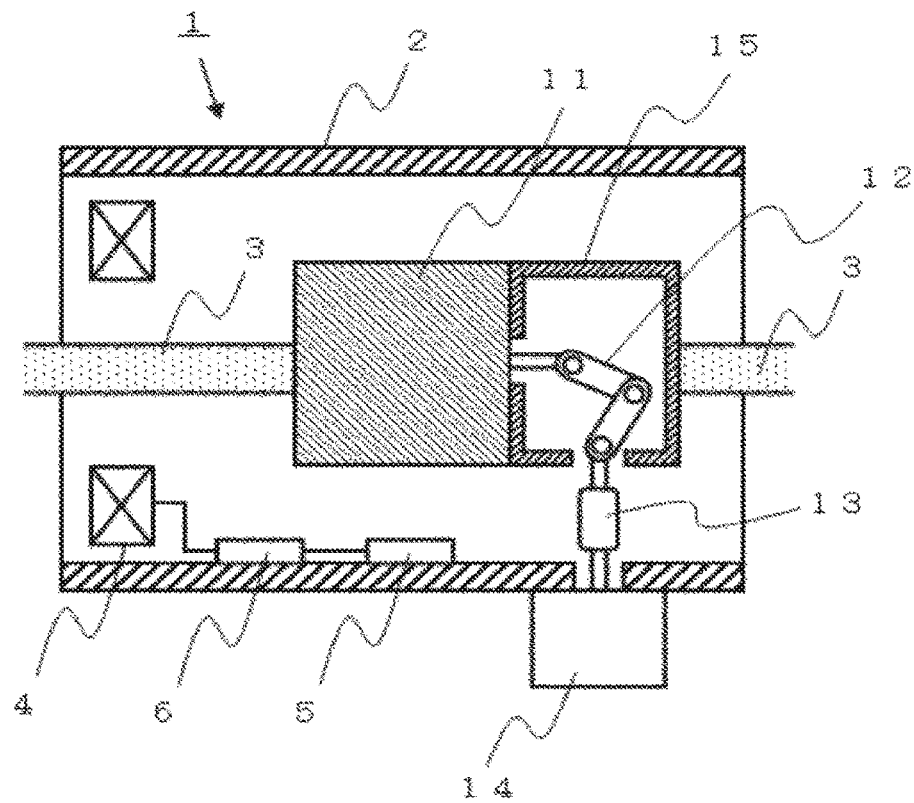
FIG. 3 is a schematic cross-sectional view of a power device in the second embodiment of the present invention.

FIG. 3 is a schematic cross-sectional view of a power device according to the second embodiment for implementing the present invention.

This power device is a gas circuit breaker, for example, placed between a power generator and a main transformer for raising the voltage generated by this power generator.

In power device 1 in the present embodiment, a rod-shaped energizing conductor 3 is placed in the center portion of a cylindrical-shaped sealed container 2. Energizing conductor 3 is held by a spacer (not shown) at the position of the central axis of the sealed container. Also, a ring-shaped coil 4 is placed centrally around energizing conductor 3. Energizing conductor 3 penetrates through the center of this ring-shaped coil 4. Thus, ring-shaped coil 4 functions as a power generation unit configured to generate power that is induced by a magnetic flux of the current flowing through energizing conductor 3. Coil 4 has an output terminal to which a power device unit 5 configured to use power generated in this coil 4 as its power source is connected. Furthermore, to this output terminal of coil 4, a short-circuit switch 6 capable of short-circuiting the output from coil 4 is connected. In the present embodiment, an electrically powered fan is used as power device unit 5.

Furthermore, an interrupter 11 is provided, which includes a pair of contacts allowing opening and closing for interrupting energization of energizing conductor 3. This interrupter 11 is further hermetically sealed inside sealed container 2, and sealed container 2 is filled inside with an insulating fluid of an atmospheric pressure or higher. A drive mechanism 12 for driving the pair of contacts provided inside the interrupter is provided horizontally adjacent to interrupter 11. This drive mechanism 12 is connected through an insulation rod 13 to an operation device 14 that is placed on the outside of sealed container 2.

In power device 1 in the present embodiment, energizing conductor 3 is separated into two parts, which are electrically connected to each other through the pair of contacts provided inside interrupter 11. In FIG. 3, energizing conductor 3 on the left side is electrically connected to a fixed contact as one contact of the pair of contacts while energizing conductor 3 on the right side is electrically connected to a movable contact as the other contact through a drive mechanism cover 15 made of a conductive material. The fixed contact and the movable contact are opened and closed by the drive mechanism.

The connection relation of coil 4, power device unit 5 and short-circuit switch 6 in the present embodiment is the same as that in the first embodiment. Power device unit 5 serving as an electrically powered fan is placed below interrupter 11 and driven by the current flowing through energizing conductor 3.

Inside interrupter 11, there is a contact surface between the contacts, so that the quantity of heat to be generated is increased by a high resistance value at this contact surface. Accordingly, the temperature at the contact rises. When the temperature at the contact rises, the temperature in interrupter 11 also rises. Sealed container 2 is filled with an insulating fluid such as $SF_6$ gas. Thus, convection is generated in this fluid by such a temperature rise in interrupter 11. In this case, the temperature rise in interrupter 11 is suppressed due to some degree of thermal diffusion. However, when the fluid with increased temperature stagnates in the upper portion inside sealed container 2, the convection stops, so that the effect of thermal diffusion is decreased.

In the power device in the present embodiment, since an electrically powered fan is disposed below interrupter 11 serving as a heat generating portion, the insulating fluid can be forcefully convected, so that the heat generating portion can be efficiently cooled. Furthermore, since coil 4 configured to generate power that is induced by the magnetic flux of the current flowing through energizing conductor 3 is used as a power source of the electrically powered fan, accessory equipment such as an external power supply is not required.

As in the first embodiment, short-circuit switch 6 capable of short-circuiting the output from coil 4 is provided also in the present embodiment. Accordingly, if short-circuit switch 6 is short-circuited when the electrically powered device using coil 4 corresponding to a power generation unit as its power source is stopped, an excessive voltage is not induced in coil 4. Consequently, a highly reliable power device can be achieved.

Furthermore, an electrically powered fan is disposed below interrupter 11 serving as a heat generating portion. Thus, this gives an effect of forcefully convecting the insulating fluid inside sealed container 2, and also allows direct cooling of the lower portion of interrupter 11. Consequently, since a temperature gradient occurs in interrupter 11, the convection of the insulating fluid inside interrupter 11 can be facilitated, thereby also achieving an effect of cooling the contact inside interrupter 11.

Third Embodiment

Figure 4:
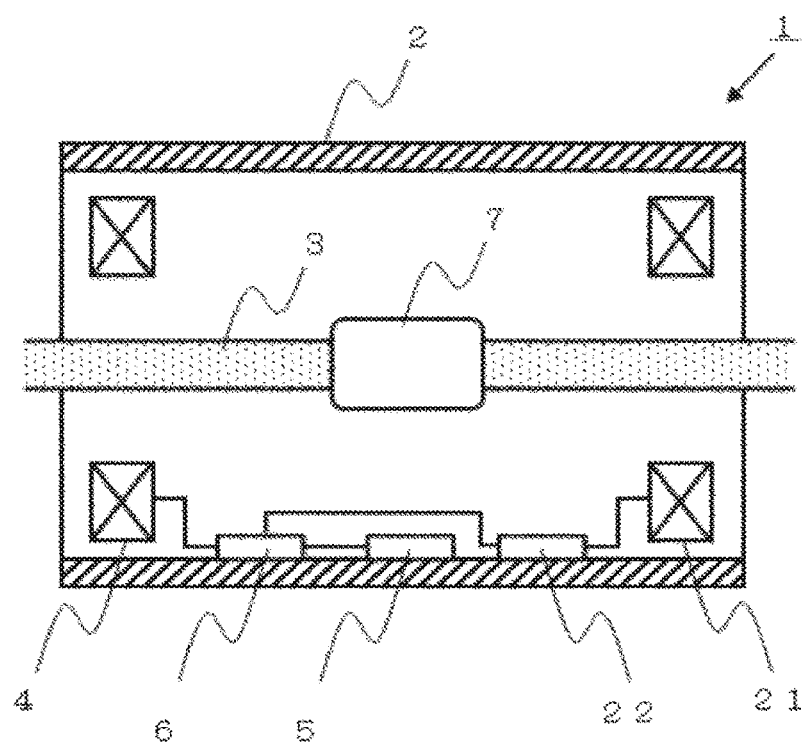
FIG. 4 is a schematic cross-sectional view of a power device in the third embodiment of the present invention.

FIG. 4 is a schematic cross-sectional view of a power device according to the third embodiment for implementing the present invention.

This power device is a gas insulated apparatus, for example, used as a bus of the power transmission line for AC power in an AC power system. Power device 1 in the present embodiment has the same configuration as that in the first embodiment, but additionally includes: a current transformer 21 for measuring the current flowing through energizing conductor 3; and a fault detector 22 configured to detect a short-circuit fault from the current measured by this current transformer 21. When fault detector 22 detects a short-circuit fault, it transmits a signal to short-circuit switch 6. Based on the signal of the short-circuit fault received from fault detector 22, short-circuit switch 6 short-circuits the output terminal of coil 4.

Figure 5:
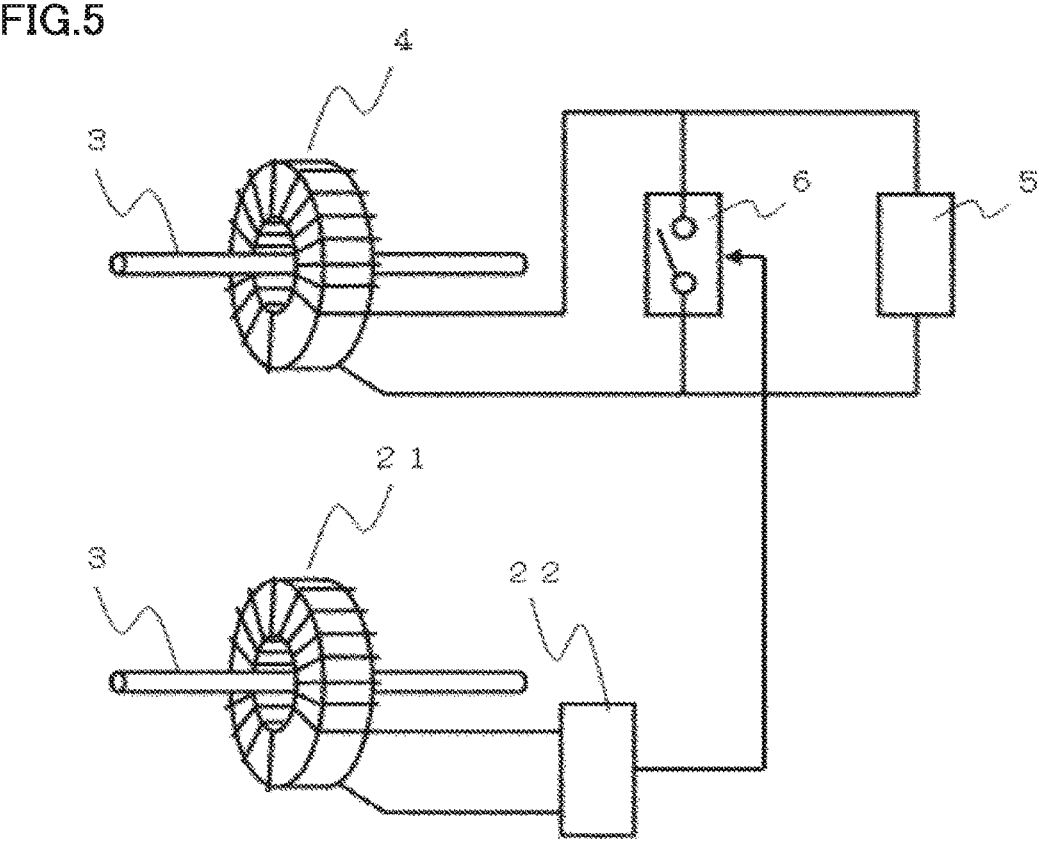
FIG. 5 is a schematic diagram showing a part of the power device in the third embodiment of the present invention.

FIG. 5 is a schematic diagram showing the connection relation of coil 4, power device unit 5, short-circuit switch 6, current transformer 21, and fault detector 22 in the present embodiment. When a short-circuit fault occurs in the AC power system due to a thunderbolt and the like, a fault current of several tens of kilo-amperes (kA) may flow through energizing conductor 3 in a short time period. When such a high current flows through energizing conductor 3, the power induced in coil 4 increases even though in a short time period, with the result that an excessive current is to flow through power device unit 5. Consequently, there is a possibility that breakage or failure may occur in power device unit 5.

As in the present embodiment, even if an excessive fault current flows through energizing conductor 3 due to a short-circuit fault and the like, the fault current is detected by current transformer 21 and fault detector 22, and then, the output terminal of coil 4 is short-circuited by short-circuit switch 6. Thus, an excessive current can be prevented from flowing through power device unit 5.

Fourth Embodiment

Figure 6:
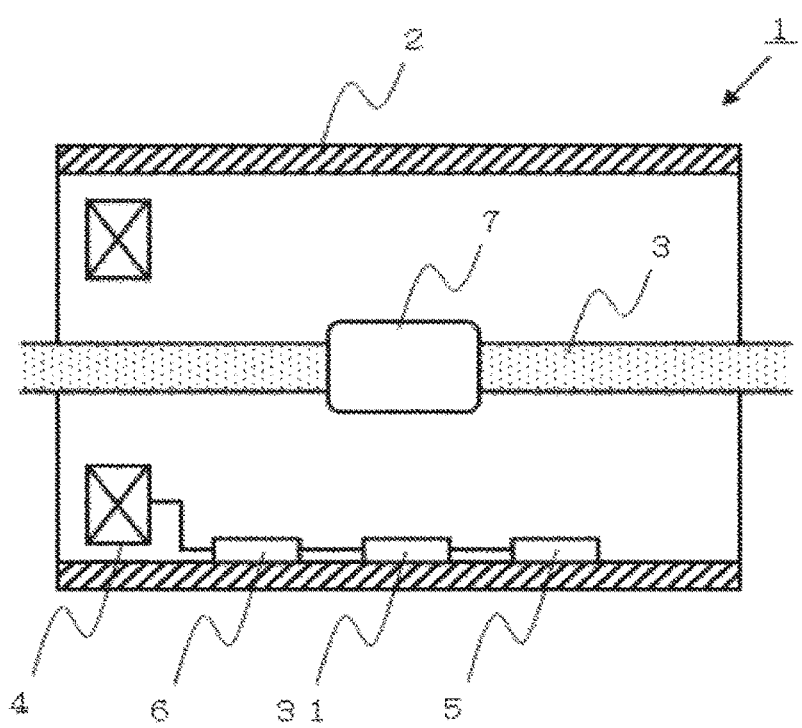
FIG. 6 is a schematic cross-sectional view of a power device in the fourth embodiment of the present invention.

FIG. 6 is a schematic cross-sectional view of a power device according to the fourth embodiment for implementing the present invention.

This power device is a gas insulated apparatus, for example, used as a bus of the power transmission line for AC power in an AC power system. Power device 1 in the present embodiment has the same configuration as that in the first embodiment, but additionally includes a separation switch 31 between short-circuit switch 6 and power device unit 5.

Figure 7:
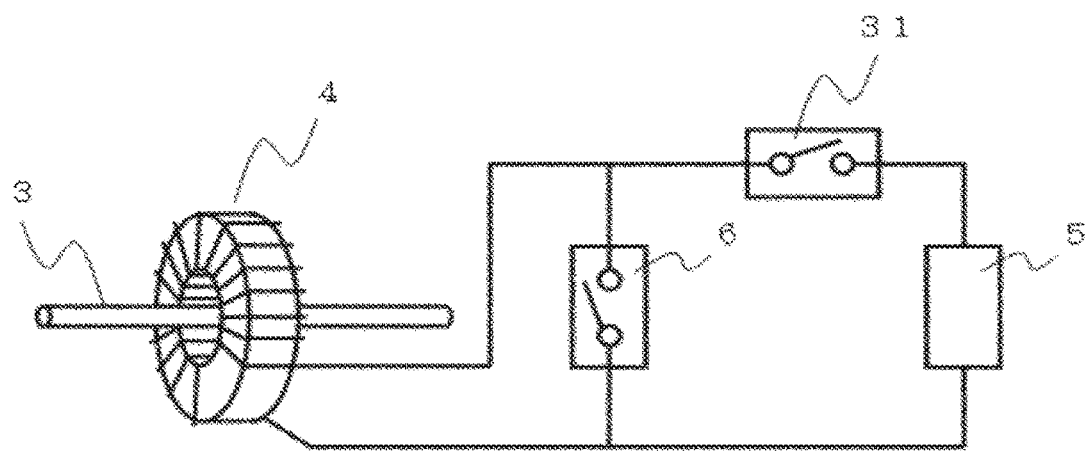
FIG. 7 is a schematic diagram showing a part of the power device in the fourth embodiment of the present invention.

FIG. 7 is a schematic diagram showing the connection relation of coil 4, power device unit 5, short-circuit switch 6, and separation switch 31 in the present embodiment. In the configuration in the first embodiment shown in FIG. 2, even when power device unit 5 is removed while short-circuit switch 6 is short-circuited in the state where the energization of energizing conductor 3 is maintained, the voltage generated by the short-circuit current flowing through short-circuit switch 6 and the on-resistance (internal resistance) on short-circuit switch 6 is to be applied to power device unit 5. When the on-resistance on short-circuit switch 6 is relatively small but the short-circuit current is relatively large, there is a possibility that the voltage kept applied to power device unit 5 may cause a problem in terms of operation safety.

As in the present embodiment, separation switch 31 is provided between short-circuit switch 6 and power device unit 5. In this state, after short-circuit switch 6 is short-circuited, separation switch 31 is opened, so that the voltage to be applied to power device unit 5 can be removed. Consequently, since power device unit 5 can be completely separated from coil 4, power device unit 5 can be safely removed.

Furthermore, a resistor may be connected between short-circuit switch 6 and the connection point of separation switch 31 and short-circuit switch 6, or between short-circuit switch 6 and the connection point of power device unit 5 and short-circuit switch 6. In other words, short-circuit switch 6 and the resistor may be connected in series. In this case, even if the short-circuit current flowing through short-circuit switch 6 is relatively large, the power generated in coil 4 is consumed by the resistor, so that the short-circuit current flowing through coil 4 can be suppressed. As a result, coil 4 can be protected and power device unit 5 can be completely separated from coil 4, so that power device unit 5 can be safely removed.

Fifth Embodiment

Figure 8:
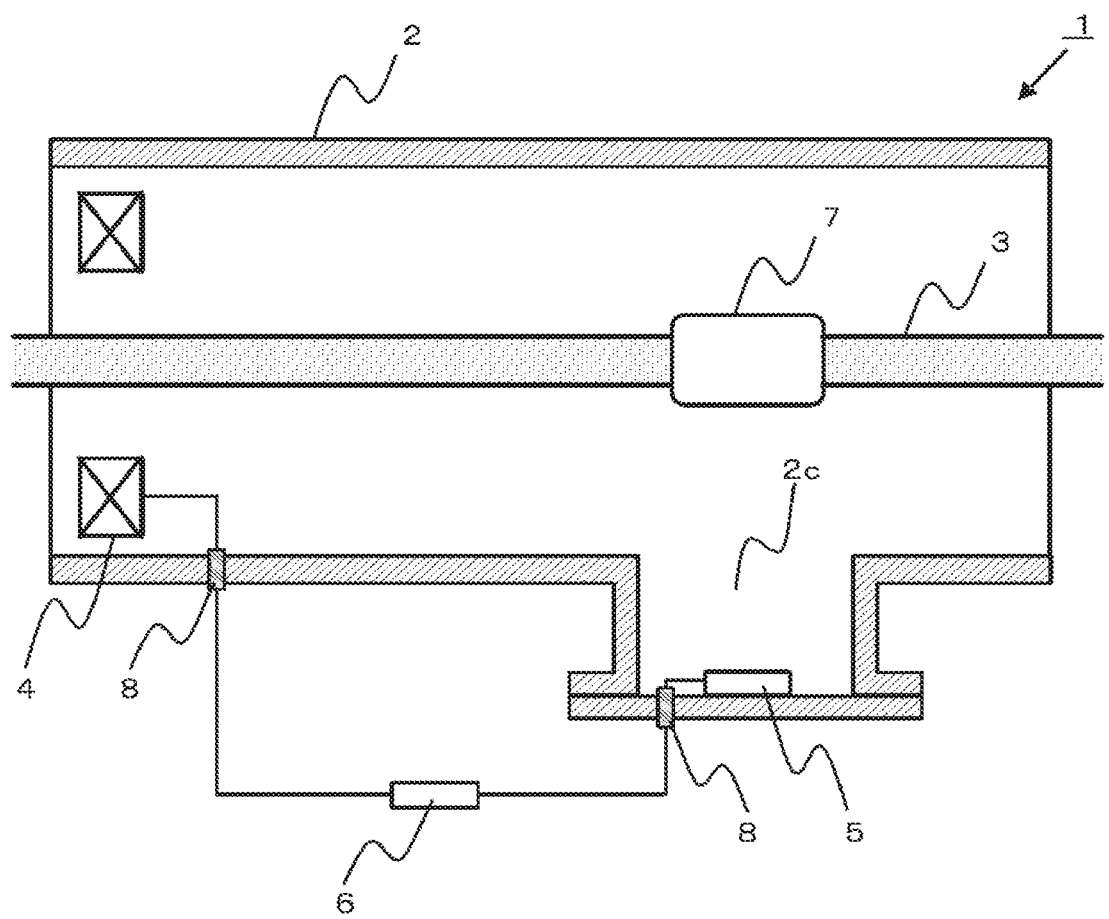
FIG. 8 is a schematic cross-sectional view of a power device in the fifth embodiment of the present invention.

FIG. 8 is a schematic cross-sectional view of a power device according to the fifth embodiment for implementing the present invention. This power device is a gas insulated apparatus, for example, used as a bus of the power transmission line for AC power in an AC power system. In addition to the configuration of power device 1 in the first embodiment, sealed container 2 has an inner wall provided with a concave portion 2c formed in a concave shape. This concave portion 2c is spaced apart from energizing conductor 3 and energizing conductor connection portion 7 as compared with other main inner walls. Power device unit 5 is disposed in concave portion 2c.

Furthermore, sealed container 2 includes a sealing terminal 8 configured to electrically connect the inside and the outside of sealed container 2 while keeping the airtightness of sealed container 2.

Furthermore, short-circuit switch 6 is disposed outside sealed container 2. Coil 4 and one end of short-circuit switch 6 are connected to each other through one sealing terminal 8 while power device unit 5 and the other end of short-circuit switch 6 are connected to each other through another sealing terminal 8.

As having been described in the first embodiment, since power device unit 5 is disposed inside sealed container 2, power device unit 5 is disposed within a high electric field space produced by the current flowing through energizing conductor 3. In other words, the electric field distribution in this high electric field space may become locally nonuniform due to the influence of power device unit 5. According to the present fifth embodiment, by placing power device unit 5 in concave portion 2c, power device unit 5 is positioned to be spaced apart from energizing conductor 3 as compared with the arrangement in the first embodiment, with the result that the influence exerted upon the electric field distribution by the current flowing through energizing conductor 3 can be reduced. In other words, higher insulation properties can be ensured.

Furthermore, short-circuit switch 6 is disposed outside sealed container 2. Accordingly, the influence of the electromagnetic noise resulting from the current flowing through energizing conductor 3 is reduced as compared with the case where short-circuit switch 6 is disposed inside sealed container 2.

In other words, according to the present fifth embodiment, in addition to the effect of cooling energizing conductor connection portion 7, the effect of monitoring the temperature of energizing conductor connection portion 7 or the like as having been described in the first embodiment, power device unit 5 is disposed in concave portion 2c, thereby reducing the influence upon the electric field distribution by the current flowing through energizing conductor 3. Consequently, higher insulation properties can be ensured. Furthermore, by placing short-circuit switch 6 on the outside of sealed container 2, the influence of the electromagnetic noise resulting from the current flowing through energizing conductor 3 can be reduced. By the above-described configurations, a highly reliable power device can be obtained.

Sixth Embodiment

Figure 9:
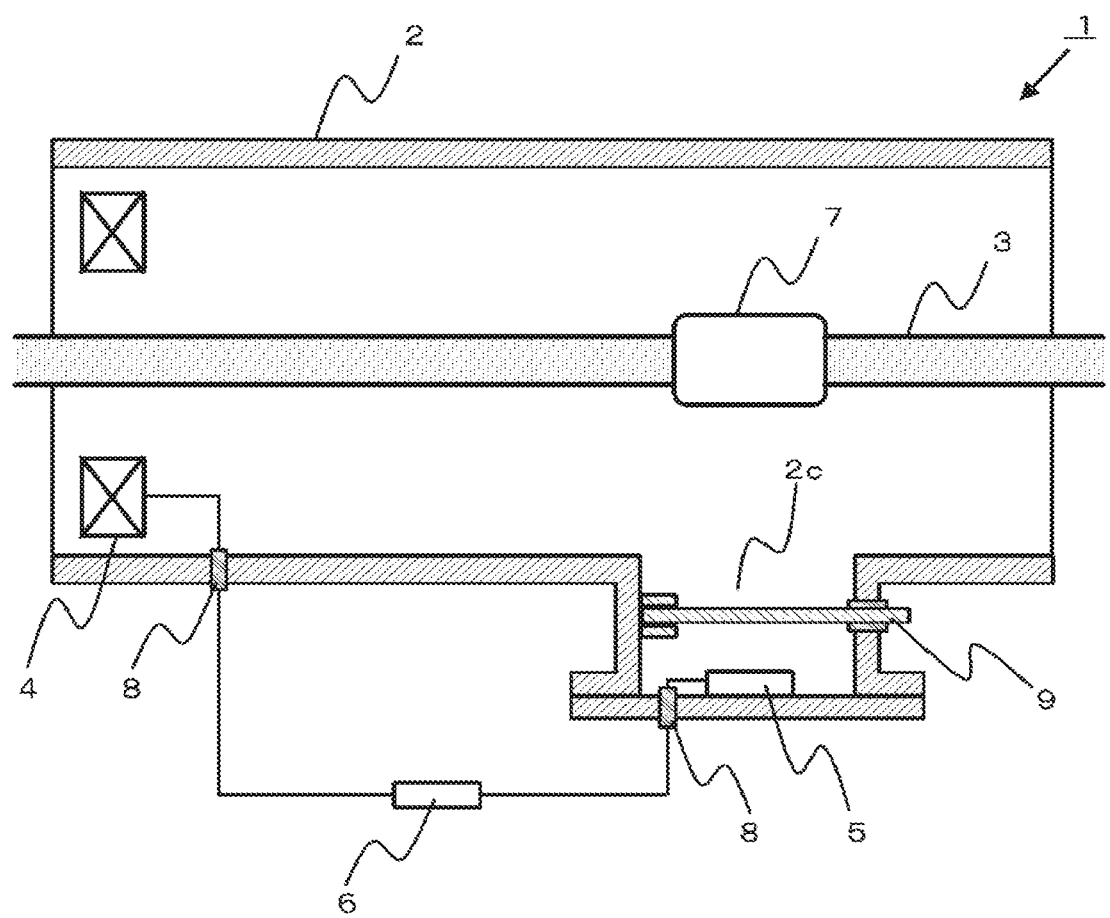
FIG. 9 is a schematic cross-sectional view of a power device in the sixth embodiment of the present invention, which shows the state where a shutter is closed.
Figure 10:
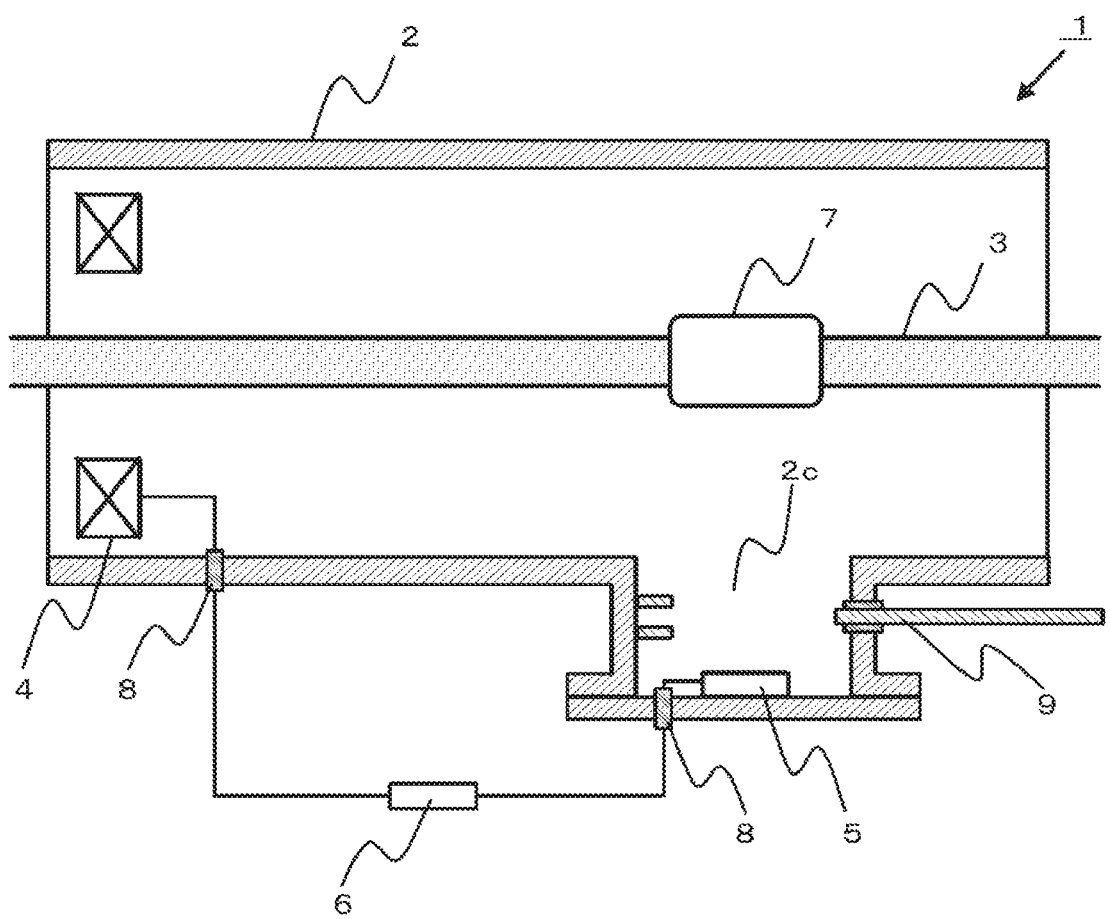
FIG. 10 is a schematic cross-sectional view of the power device in the sixth embodiment of the present invention, which shows the state where the shutter is opened.

FIGS. 9 and 10 each are a schematic cross-sectional view of a power device according to the sixth embodiment for implementing the present invention. This power device is a gas insulated apparatus, for example, used as a bus of the power transmission line for AC power in an AC power system. In addition to the configuration of power device 1 in the fifth embodiment, a shutter 9 is provided, which serves as a partition mechanism for providing a partition between concave portion 2c including power device unit 5 and other main portions in sealed container 2. FIG. 9 shows the state where shutter 9 is closed, and FIG. 10 shows the state where shutter 9 is opened. In the state where power device 1 is normally used, shutter 9 is opened as shown in FIG. 10.

In the case where power device unit 5 is an electrically powered fan, assuming that the time period during which an ordinary electrically powered fan can be operated by the number of operating times during its operating life is tens of thousands of hours, power device 5 continuously used without being stopped for a long time period of several decades needs to undergo maintenance such as replacement or repair several times during this time period.

When this maintenance is performed, as shown in FIG. 9, only concave portion 2c including power device unit 5 is opened after shutter 9 is closed. In other words, since maintenance can be performed without opening the main portion in sealed container 2, the time period related to such maintenance can be shortened.

Specifically, according to the present sixth embodiment, in addition to the effect having been described in the fifth embodiment, the time period related to maintenance can be shortened by providing shutter 9 that provides a partition between concave portion 2c including power device unit 5 and other main portions in sealed container 2.

REFERENCE SIGNS LIST

1 power device, 2 sealed container, 2c concave portion, 3 energizing conductor, 4 coil, 5 power device unit, 6 short-circuit switch, 7 energizing conductor connection portion, 9 shutter, 11 interrupter, 12 drive mechanism, 13 insulation rod, 14 operation device, 15 drive mechanism cover, 21 current transformer, 22 fault detector, 31 separation switch.

The invention claimed is:

1. A power device comprising:
    an energizing conductor;
    a power generation unit configured to generate power that is induced by a magnetic flux of a current flowing through the energizing conductor;
    a power device unit configured to use power generated in the power generation unit as a power source;
    a short-circuit switch capable of short-circuiting an output from the power generation unit;
    a sealed container in which the energizing conductor, the power generation unit and the power device unit are included, an insulating fluid being enclosed in the sealed container;
    a separation switch which interrupts supply of power to the power device unit when the short-circuit switch short-circuits the output from the power generation unit; and
    a current transformer configured to measure an amount of a current flowing through the energizing conductor, wherein
    the short-circuit switch is controlled based on the amount of the current measured by the current transformer.

2. The power device according to claim 1, further comprising a resistor connected in series to the short-circuit switch.

3. The power device according to claim 1, wherein the power generation unit is a ring-shaped coil having a center portion through which the energizing conductor penetrates.

4. The power device according to claim 1, wherein the energizing conductor includes an interrupter configured to interrupt a current flowing through the energizing conductor.

5. The power device according to claim 4, wherein
the interrupter has a sealed structure in which a fixed contact and a movable contact are included, and
the sealed structure is isolated from the insulating fluid enclosed in the sealed container.

6. The power device according to claim 1, wherein the sealed container has an inner wall provided with a concave portion, and the power device unit is provided inside the concave portion.

7. The power device according to claim 6, further comprising a partition mechanism configured to provide a partition between: a portion having the power device unit provided in the concave portion; and a portion included in the sealed container and excluding the portion having the power device unit provided in the concave portion.

8. The power device according to claim 1, wherein the short-circuit switch or the separation switch is disposed outside the sealed container.

9. The power device according to claim 1, wherein the power device unit is an electrically powered fan or a temperature sensor.

10. The power device according to claim 1, wherein the power device is a gas insulated apparatus.

* * * * *